Oct. 30, 1928.

W. BROWN 1,689,474

CUTTING TOOL FOR LATHES, PLANERS, ETC

Original Filed Dec. 12, 1921

Inventor:
Walter Brown.
By John C. Higdon
Attorney.

Patented Oct. 30, 1928.

1,689,474

UNITED STATES PATENT OFFICE.

WALTER BROWN, OF TOLEDO, OHIO.

CUTTING TOOL FOR LATHES, PLANERS, ETC.

Application filed December 12, 1921, Serial No. 521,603. Renewed June 18, 1928.

My invention consists in the novel construction and arrangement of parts hereinafter particularly described and distinctly claimed.

The object of my invention is to provide an improved metal cutting-tool for lathes, planers, shapers, and the like; which shall be very simple and of low cost, and yet highly efficient in operation.

Figure 1:
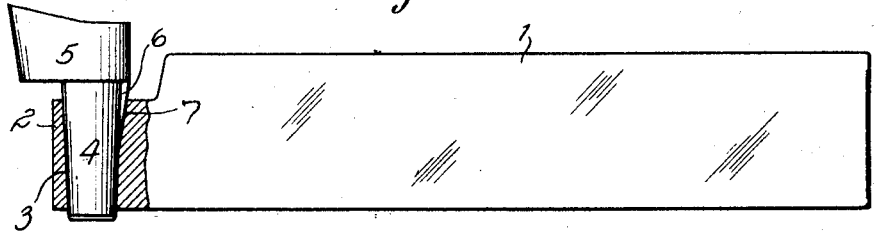
Fig. 1 is a side-elevation, partly in section, of a tool constructed in accordane with my invention.
Figure 2:
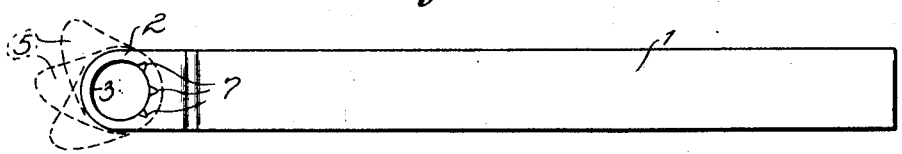
Fig. 2 is a top plan-view of the same.

The numeral 1 designates the holder or shank, which is to be made of any suitable steel or other material, preferably rectangular in cross-section, and of any desired length and size, to fit the usual tool-post of the lathe, or the tool-clamp of any other metal-cutting machine.

One end of said holder 1 is rectangular, as usual; but the opposite end (the nose) 2, is preferably rounded off, and provided with a tapered socket 3 in which the tapered shank 4 of the cutter 5 is detachably seated, and held solely by frictional contact of the tapered shank with the tapered walls of said socket; so that, in placing said shank in said socket the said cutter 5 carried by the shank may be set at any desired angle, to suit the work to be done.

Any number of cutters 5, of various sizes, may be provided; but the shanks of all of them should, of course, be of the same size, to fit the said tapered socket 3 of the holder 1 interchangeably.

There is also a longitudinal fin, spline, key, or wing 6, preferably formed integral with the said tapered shank 4 of said cutter 5, which fits detachably in any one of a radial series of key-seats 7 formed upon the interior of the said tapered socket 3 of the holder 1.

This construction is provided as a fixed setting-gauge for the shank 4 of the cutter, so that the machinist or operator may quickly set the cutter at the desired angle, by merely dropping its tapered shank into said tapered socket 3 loosely, and then turning same in said socket until said fin, spline, key or wing 6 drops into the desired one of the key-seats 7; whereupon the cutter will be ready for immediate use in making the heaviest cuts.

Said fin, key, spline or wing 6 is not at all necessary to hold the said tapered shank 4 of the cutter against rotation in the tapered socket 3, inasmuch as frictional contact alone is amply sufficient to prevent accidental movement of said shank in said socket; and during the cutting of the heaviest kinds, there will be no slipping of the shank in its socket, owing to the perfect fit and proper taper of said parts.

Said cutter 5 and its tapered shank 4, are preferably made in one piece, of any suitable steel, or other metal-cutting material; but it may be made in pieces, and the shank fastened in its socket by any common means desired to be used.

I claim:—

1. The combination with a tool holder member having a tapering socket, of a removable cutting tool member having a correspondingly tapered shank for frictionally engaging said socket, and an integral cutting portion extending transversely of said shank, one of said members having a series of angularly arranged recesses and the other member having a projection alternatively engageable with said recess to angularly position the cutting tool with respect to said holder.

2. The combination with a tool holder member having a tapering socket at one end thereof having its axis transverse to the longitudinal axis of said member, of a removable cutting tool comprising a tapered shank member frictionally engageable with said socket, a transversely extending cutting portion rigidly secured to said shank member when the latter is engaged with or disengaged from said holder, one of said members having a series of angularly spaced recesses at the large tapered end thereof and the other of said members having a projection adapted to alternatively engage said recesses for angularly setting the cutting portion in a predetermined position.

3. The combination with a tool holder having a tapered socket at one end thereof, provided with a series of angularly spaced recesses, of a cutting tool having a cutting portion projecting beyond said tool holder, and an integral tapered shank extending transversely of said cutting portion and provided with an integral projection at the large end of the taper, said shank being adapted to frictionally engage said socket in a plurality of positions corresponding to said series of recesses.

In testimony whereof, I have signed my name to this specification.

WALTER BROWN.